United States Patent
Ghai

(10) Patent No.: US 9,686,808 B2
(45) Date of Patent: Jun. 20, 2017

(54) CENTRALLY MANAGED WI-FI

(71) Applicant: Benu Networks, Inc., Billerica, MA (US)

(72) Inventor: Rajat Ghai, Sandwich, MA (US)

(73) Assignee: BENU NETWORKS, INC., Billerica, MA (US)

( * ) Notice: Subject to any disclaimer, the term of this patent is extended or adjusted under 35 U.S.C. 154(b) by 0 days.

(21) Appl. No.: 14/460,657

(22) Filed: Aug. 15, 2014

(65) Prior Publication Data

US 2015/0049714 A1    Feb. 19, 2015

Related U.S. Application Data

(60) Provisional application No. 61/866,354, filed on Aug. 15, 2013.

(51) Int. Cl.
| | |
|---|---|
| *H04W 4/02* | (2009.01) |
| *H04W 76/02* | (2009.01) |
| *H04W 48/20* | (2009.01) |
| H04W 88/16 | (2009.01) |
| H04W 84/12 | (2009.01) |

(52) U.S. Cl.
CPC .......... *H04W 76/02* (2013.01); *H04W 48/20* (2013.01); *H04W 84/12* (2013.01); *H04W 88/16* (2013.01)

(58) Field of Classification Search
CPC .................................................. H04W 76/02
See application file for complete search history.

(56) References Cited

U.S. PATENT DOCUMENTS

| | | |
|---|---|---|
| 6,996,628 B2 | 2/2006 | Keane et al. |
| 2005/0185635 A1 | 8/2005 | Nagendra |
| 2008/0072047 A1 | 3/2008 | Sarikaya et al. |
| 2008/0198811 A1 | 8/2008 | Deshpande et al. |
| 2009/0086742 A1 | 4/2009 | Ghai et al. |
| 2009/0154415 A1 | 6/2009 | Park et al. |
| 2009/0199281 A1 | 8/2009 | Cai et al. |
| 2010/0177752 A1 | 7/2010 | Aggarwal et al. |
| 2010/0192207 A1 | 7/2010 | Raleigh |

(Continued)

OTHER PUBLICATIONS

International Search Report and Written Opinion issued by the U.S. Patent and Trademark Office as International Searching Authority for International Application No. PCT/US14/51264 mailed Nov. 13, 2014 (12 pgs.).

*Primary Examiner* — Fan Ng
(74) *Attorney, Agent, or Firm* — Wilmer Cutler Pickering Hale and Dorr LLP

(57) ABSTRACT

Described herein are techniques for providing centrally managed Wi-Fi using internet protocol (IP) connections between a central Wi-Fi access gateway and one or more radio nodes. The Wi-Fi access gateway establishes an IP connection with a radio node across a wide area network, wherein the radio node is configured to wirelessly connect to one or more Wi-Fi devices located near the radio node. The Wi-Fi access gateway receives Layer 2 data traffic over the IP connection, wherein the Layer 2 data traffic is associated with a Wi-Fi device from the one or more Wi-Fi devices connected to the radio node. The Wi-Fi access gateway controls one or more Wi-Fi services for the Wi-Fi device based on the Layer 2 data traffic so that the Wi-Fi access gateway can provide centrally managed Wi-Fi for the Wi-Fi device.

13 Claims, 5 Drawing Sheets

(56) References Cited

U.S. PATENT DOCUMENTS

| | | | |
|---|---|---|---|
| 2011/0274082 A1* | 11/2011 | Calhoun | H04W 40/24 370/331 |
| 2013/0083691 A1 | 4/2013 | Murphy et al. | |
| 2013/0083782 A1 | 4/2013 | Murphy et al. | |
| 2013/0287012 A1* | 10/2013 | Pragada | H04W 76/045 370/338 |
| 2014/0192795 A1 | 7/2014 | Balar et al. | |
| 2014/0269535 A1* | 9/2014 | Pazhyannur | H04W 40/24 370/329 |
| 2015/0235329 A1 | 8/2015 | Lu et al. | |

\* cited by examiner

CENTRALLY MANAGED WI-FI

RELATED APPLICATIONS

This application relates to and claims priority under 35 U.S.C. §119(e) to U.S. Provisional Patent Application No. 61/866,354, filed on Aug. 15, 2013, which is hereby incorporated herein by reference in its entirety.

FIELD

The subject matter disclosed in this application generally relates to centrally managed Wi-Fi, more specifically, to creating easily scalable centrally-managed Wi-Fi using software defined networking techniques.

BACKGROUND

Less than a decade ago most people carried only one Wi-Fi enabled device—a Wi-Fi enabled laptop. Since then, what is often referred to as the Wi-Fi revolution has taken the world by a storm. According to Wi-Fi Alliance, there were approximately 1.1 Billion Wi-Fi enabled devices shipped in 2012 alone. With the proliferation of Wi-Fi enabled smartphones, tablets, gaming consoles and embedded household appliances like TVs, an average household has more than five Wi-Fi enabled devices at any given time. Wi-Fi devices support a number vertical applications like health, fitness, smart energy and internet of things (IoT). These and other applications are anticipated to drive the total amount of Wi-Fi shipments per year to double to 2.2 Billion in 2016. One universal Wi-Fi spectrum and the rapid standardization and adoption cycle of Wi-Fi technologies such as 802.11a/b/g/n and soon 802.11 u and 802.11 ac has made Wi-Fi the broadband wireless access of choice.

In parallel, cloud computing and associated cloud technologies are creating an information technology (IT) revolution of their own. The adoption of cloud technology was possible due to cheap long haul transmission capacity (often referred to as "fat pipes"), and the low cost of compute cycles and storage. Leveraging this trend, Wi-Fi and cloud technologies combined are expected to usher in a new era of ubiquitous networking and service availability.

The first generation Wi-Fi access points (APs) were standalone APs such as those provided by Linksys, Netgear, etc. Such APs are often referred to as autonomous, independent, or fat APs. Such access points typically have a complete IP router function that includes a local Dynamic Host Configuration Protocol (DHCP) server, a basic network address translation (NAT) port, support for popular port triggering protocols (e.g., such as Universal Plug and Play (UPnP) protocols, and NAT port mapping protocol (PMP)), and a domain name system (DNS) server. Some of these Wi-Fi access points include basic access control functions (ACL) like media access control (MAC) filtering and time of the day-based internet access restrictions.

However, such first generation standalone APs must typically be configured individually. Therefore, to deploy multiple standalone APs (which is becoming the norm), a network administrator must log into and configure each Wi-Fi AP independently, making configuration changes a tedious and error-prone process. In addition, standalone APs make it difficult for the user to monitor the wireless network in a centralized manner; obtaining statistics such as aggregated bandwidth statistics, usage data, and/or status information across all of the APs in the network must be done manually. Further, to configure the AP the network administrator often needed to be familiar with IP networking and the configuration options for the AP that were made available through a graphical user interface (GUI) provided by an embedded web server in the AP. Additionally, broadband service providers often cannot provide any value added device management services because the Wi-Fi home access point NATs all the IP traffic and hides all device visibility.

Campuses and large enterprise applications often require the management of multiple APs (e.g., 10 s to a few 100 access points). Standalone APs were fast becoming impossible to manage in any scale, so companies began to move to a hierarchical architecture for centralized monitoring and configuration of APs. Some such architectures included a Wireless Access Controller designed to scale to a few hundred APs. The interface between the AP and controller was proprietary and loosely based on the Control and Provisioning of Wireless Access Points (CAPWAP) protocol (e.g., specified in RFC 5415). The Wi-Fi access and the IP router functions of the standalone AP were split between the dependent AP and the Wireless Access Controller. Since the interface between the controller and AP was vendor specific, the split functionality varied between vendors. Other architectures can also include an AP architecture where certain functions of the Wi-Fi MAC were split between the APs and the controller (often referred to as a "split MAC architecture"). This architecture can allow the controller to perform centralized radio frequency (RF) management of APs for interference mitigation and coordination.

However, such controllers operate at Layer 3 (or higher) and provide centralized management and configuration of the IP control plane, the traffic/forwarding plane, and RF management. This configuration (e.g., typically implemented on a 1RU or 2RU servers) can severely limit the scalability of such a solution to a few hundred APs, which is not suitable for the massive scale of outdoor and residential applications. For example, tens of thousands of Wireless Access Controllers would need to be deployed to support millions of concurrently active devices. Such a solution would be nearly impossible to manage and would be cost prohibitive since Wireless Access Controllers are very expensive. Further, the Wireless Access Controller is a single point of failure, so if a WLAN controller fails then all of the APs connected to that controller will also fail. Dual-redundant controllers, while technically possible, are often cost prohibitive. And like first generation APs, device management and device centric value added services can't be provided because the controller hides the topology and the devices that the controller manages.

SUMMARY

Given the proliferation of Wi-Fi devices, it would be advantageous for service providers to be able to provide managed Wi-Fi services to residential and business customers. In many cases, home networks now have more Wi-Fi devices than early enterprise networks. Managed Wi-Fi is attractive to residential users because it can offer continuous Wi-Fi access to their smartphones and tablets (post PC devices) across multiple remotely-located radio nodes, as well as device centric value-added services. Service provider managed Wi-Fi solutions are also attractive for businesses to allow businesses to lower their IT costs by not needing to procure and deploy their own standalone or controller-based Wi-Fi solutions.

In accordance with the disclosed subject matter, systems and methods are described herein to provide an architecture that leverages software-defined networking (SDN) principles to provide highly scalable mobile Ethernet over a wide area network (WAN). The techniques provide for creating a Layer 2 virtual switching domain for the data plane and a separate control plane. The Layer 2 domain has the simplicity and agility of Ethernet to provide ultra-scalable Wi-Fi that extends to 10s of millions of devices.

Disclosed subject matter includes, in one aspect, a computerized method for providing centrally managed Wi-Fi using internet protocol (IP) connections between a central Wi-Fi access gateway and one or more radio nodes, wherein the radio nodes and the Wi-Fi access gateway are connected across a wide area network, and the Wi-Fi access gateway controls Wi-Fi services for Wi-Fi devices connected to the radio nodes. A Wi-Fi access gateway establishes an IP connection with a radio node across a wide area network, wherein the radio node is configured to wirelessly connect to one or more Wi-Fi devices located near the radio node. The Wi-Fi access gateway receives Layer 2 traffic over the IP connection, wherein the Layer 2 traffic is associated with a Wi-Fi device from the one or more Wi-Fi devices connected to the radio node. The Wi-Fi access gateway controls one or more Wi-Fi services for the Wi-Fi device based on the Layer 2 traffic so that the Wi-Fi access gateway can provide centrally managed Wi-Fi for the Wi-Fi device.

In some embodiments, it is determined that a destination of the Layer 2 traffic is a second Wi-Fi device from the one or more Wi-Fi devices connected to the radio node, and a message is transmitted to the radio node to cause the radio node to locally route traffic between the Wi-Fi device and the second Wi-Fi device so that it is not routed to the Wi-Fi access gateway. Transmitting the message to the radio node can include transmitting a message to update a forwarding information base at the radio node to cause the radio node to locally route traffic between the Wi-Fi device and the second Wi-Fi device.

In some embodiments, it is determined that a destination of the Layer 2 traffic is a second Wi-Fi device connected to a second radio node, wherein the Wi-Fi access gateway is connected to the second radio node by a second IP connection across the wide area network, and the Layer 2 traffic is transmitted to the second radio node over the second IP connection. Based on the Layer 2 traffic, it can be determined that the Wi-Fi device associated with the Layer 2 traffic had a Wi-Fi data connection with a second, different radio node, and that the Wi-Fi device moved so that the Wi-Fi device has a Wi-Fi connection with the radio node instead of with the second radio node, and the Wi-Fi data connection can be maintained with the Wi-Fi device even though it moved from being connected to the second radio node to the first radio node. A data connection can be provided between the radio node and the Wi-Fi access gateway using the IP connection, such that the control plane to the radio node is provided using a different connection to the radio node.

In some embodiments, a MAC address associated with the Wi-Fi device is identified in a first Layer 2 data frame received from the Wi-Fi device through the IP connection, and the Wi-Fi device with the radio node. Layer 2 data from a second radio node can be received over a second IP connection with the second radio node, the MAC address associated with the Wi-Fi device can be identified in the Layer 2 data from the second radio node, and the Wi-Fi device can be associated with the second radio node instead of the first radio node to initiate a handover of the Wi-Fi device from the radio node to the second radio node.

Disclosed subject matter includes, in another aspect, a computing system configured to provide centrally managed Wi-Fi using internet protocol (IP) connections with one or more radio nodes, wherein the radio nodes are connected to the computing system across a wide area network, and the computing system controls Wi-Fi services for Wi-Fi devices connected to the radio nodes. The computing system can include a processor configured to run a module stored in memory that is configured to cause the processor to establish an IP connection with a radio node across a wide area network, wherein the radio node is configured to wirelessly connect to one or more Wi-Fi devices located near the radio node, receive Layer 2 traffic over the IP connection, wherein the Layer 2 traffic is associated with a Wi-Fi device from the one or more Wi-Fi devices connected to the radio node, and control one or more Wi-Fi services for the Wi-Fi device based on the Layer 2 traffic so that the Wi-Fi access gateway can provide centrally managed Wi-Fi for the Wi-Fi device.

In some embodiments, the module is configured to cause the processor to determine that a destination of the Layer 2 traffic is a second Wi-Fi device from the one or more Wi-Fi devices connected to the radio node, and transmit a message to the radio node to cause the radio node to locally route traffic between the Wi-Fi device and the second Wi-Fi device so that it is not routed to the Wi-Fi access gateway. Transmitting the message to the radio node can include transmitting a message to update a forwarding information base at the radio node to cause the radio node to locally route traffic between the Wi-Fi device and the second Wi-Fi device.

In some embodiments, the module is configured to cause the processor to determine that a destination of the Layer 2 traffic is a second Wi-Fi device connected to a second radio node, wherein the Wi-Fi access gateway is connected to the second radio node by a second IP connection across the wide area network, and transmit the Layer 2 traffic to the second radio node over the second IP connection. The module can be configured to cause the processor to determine, based on the Layer 2 traffic, that the Wi-Fi device associated with the Layer 2 traffic had a Wi-Fi data connection with a second, different radio node, and that the Wi-Fi device moved so that the Wi-Fi device has a Wi-Fi connection with the radio node instead of with the second radio node, and maintain the Wi-Fi data connection with the Wi-Fi device even though it moved from being connected to the second radio node to the first radio node.

In some embodiments, the module is configured to cause the processor to identify a MAC address associated with the Wi-Fi device in a first Layer 2 data frame received from the Wi-Fi device through the IP connection, associate the Wi-Fi device with the radio node, receive Layer 2 data from a second radio node over a second IP connection with the second radio node, identify the MAC address associated with the Wi-Fi device in the Layer 2 data from the second radio node, and associate the Wi-Fi device with the second radio node instead of the first radio node to initiate a handover of the Wi-Fi device from the radio node to the second radio node.

Disclosed subject matter includes, in yet another aspect, a non-transitory computer readable medium having executable instructions operable to cause an apparatus to establish an IP connection with a radio node across a wide area network, wherein the radio node is configured to wirelessly connect to one or more Wi-Fi devices located near the radio node, receive Layer 2 traffic over the IP connection, wherein the Layer 2 traffic is associated with a Wi-Fi device from the one or more Wi-Fi devices connected to the radio node, and control one or more Wi-Fi services for the Wi-Fi device based on the Layer 2 traffic so that the Wi-Fi access gateway can provide centrally managed Wi-Fi for the Wi-Fi device.

In some embodiments, the non-transitory computer readable medium has executable instructions operable to cause an apparatus to determine that a destination of the Layer 2 traffic is a second Wi-Fi device from the one or more Wi-Fi devices connected to the radio node, and transmit a message to the radio node to cause the radio node to locally route traffic between the Wi-Fi device and the second Wi-Fi device so that it is not routed to the Wi-Fi access gateway. Transmitting the message to the radio node can include transmitting a message to update a forwarding information base at the radio node to cause the radio node to locally route traffic between the Wi-Fi device and the second Wi-Fi device.

In some embodiments, the non-transitory computer readable medium includes executable instructions operable to cause an apparatus to determine that a destination of the Layer 2 traffic is a second Wi-Fi device connected to a second radio node, wherein the Wi-Fi access gateway is connected to the second radio node by a second IP connection across the wide area network, and transmit the Layer 2 traffic to the second radio node over the second IP connection.

In some embodiments, the non-transitory computer readable medium can include executable instructions operable to cause an apparatus to determine, based on the Layer 2 traffic, that the Wi-Fi device associated with the Layer 2 traffic had a Wi-Fi data connection with a second, different radio node, and that the Wi-Fi device moved so that the Wi-Fi device has a Wi-Fi connection with the radio node instead of with the second radio node, and maintain the Wi-Fi data connection with the Wi-Fi device even though it moved from being connected to the second radio node to the first radio node.

In some embodiments, the non-transitory computer readable medium includes executable instructions operable to cause an apparatus to identify a MAC address associated with the Wi-Fi device in a first Layer 2 data frame received from the Wi-Fi device through the IP connection, associate the Wi-Fi device with the radio node, receive Layer 2 data from a second radio node over a second IP connection with the second radio node, identify the MAC address associated with the Wi-Fi device in the Layer 2 data from the second radio node, and associate the Wi-Fi device with the second radio node instead of the first radio node to initiate a handover of the Wi-Fi device from the radio node to the second radio node.

Various embodiments of the subject matter disclosed herein can provide one or more of the following capabilities. The techniques described herein combine the simplicity, agility and cost effectiveness of Ethernet with cloud technologies and software defined networking (SDN) techniques to create a Layer 2 mobile Ethernet architecture. A centralized Wi-Fi access gateway can perform Layer 2 aggregation of the user plane, value added subscriber services, and/or the like. The architecture can be used to scale centralized Wi-Fi to support millions and tens of millions of concurrently active devices in a cost-effective manner (e.g., without needing to deploy tens of thousands of Wireless Access Controllers). The techniques also provide for device management and enable new value added services that were not otherwise available with prior Wi-Fi solutions. The techniques can separate Wi-Fi radio resource management from the user plane.

These and other capabilities of embodiments of the disclosed subject matter will be more fully understood after a review of the following figures, detailed description, and claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Software-defined networking (SDN) is an approach to computer networking that allows network administrators to manage network services through abstraction of lower level functionality. Abstraction is done by decoupling the system that makes decisions about where traffic is sent (e.g., referred to as the "control plane") from the underlying systems that forward traffic to the selected destination (e.g., referred to as the "data plane"). SDN principles of separating the control plane and data plane can leverage cloud computing technology to realize a large scale cloud networking infrastructure.

Figure 1:
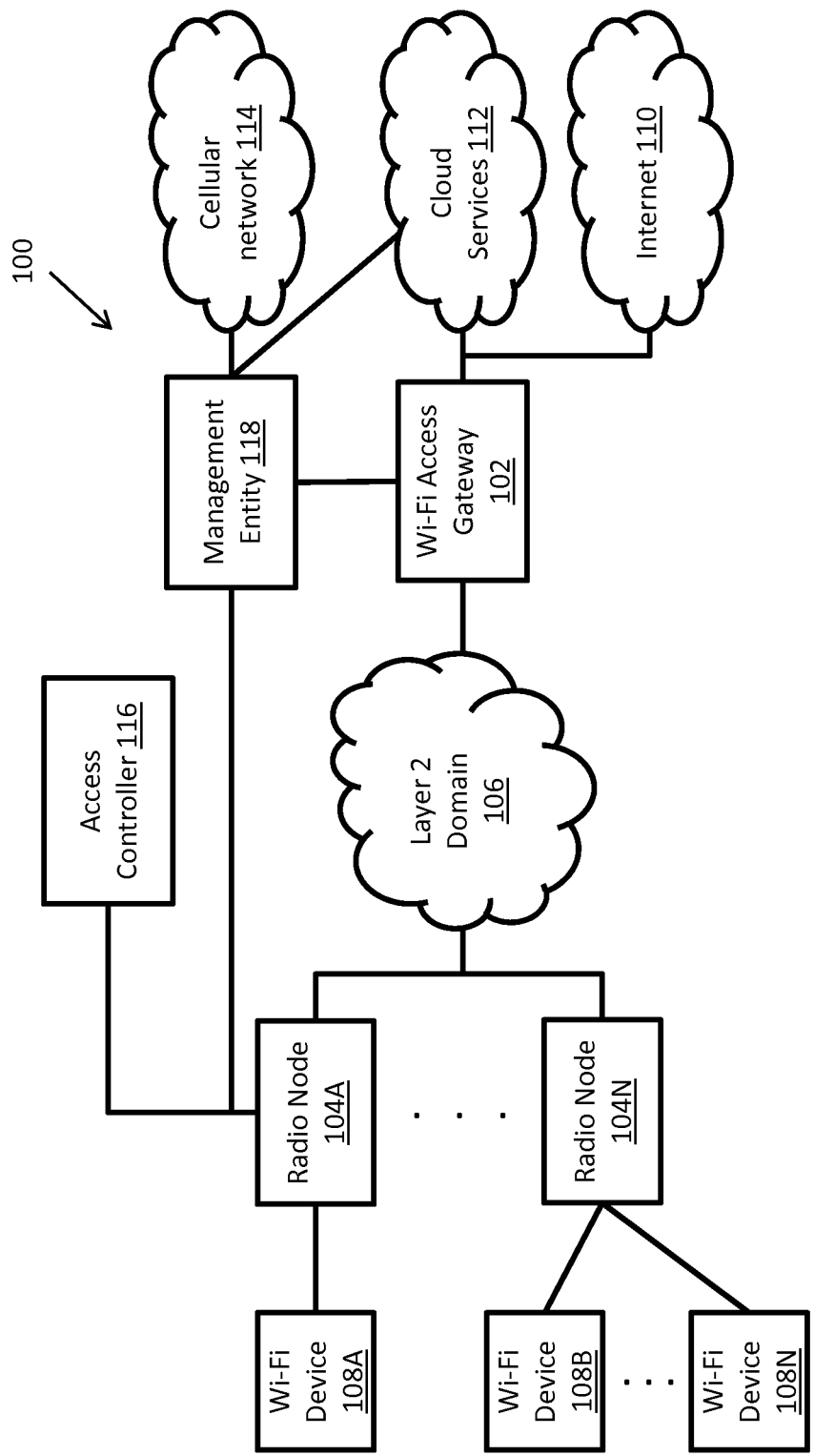
FIG. 1 illustrates a block diagram of a system for centrally managed Wi-Fi, according to some embodiments.

SDN principles can be applied to provide a Wi-Fi architecture that separates the data and control planes to provide a Layer 2-based data framework for centrally managed Wi-Fi. FIG. 1 illustrates a block diagram of a system 100 for centrally managed Wi-Fi, according to some embodiments. In some embodiments the system 100 can be a wide area switched Layer 2 Wi-Fi domain that extends to millions of Wi-Fi devices. As shown in FIG. 1, the system 100 includes a Wi-Fi access gateway 102 (also referred to herein as WAG 102) in communication with radio nodes 104A through 104N (collectively referred to herein as radio node 104) via a Layer 2 domain 106. Each radio node 104 can be in communication with a set of Wi-Fi devices. As shown in system 100, radio node 104A is in communication with Wi-Fi device 108A and radio node 104N is in communication with Wi-Fi device 108B through Wi-Fi device 108N (collectively referred to herein as Wi-Fi device 108). Wi-Fi access gateway 102 is connected to the internet 110 and cloud services 112. Management entity 118 is connected to the WAG 102, the OSS/BSS 114, the cloud services 112, and the radio nodes 104. The Wi-Fi Access Gateway 102 is also in communication with a access controller 116 that is in communication with the radio nodes 104.

As shown in FIG. 1, the system 100 configuration separates the control plane (e.g., a WLAN/RRM control plane) and the user device traffic plane. The control plane is provided by the access controller 116 to the radio nodes 104. In some embodiments, the control plane is tunneled using CAPWAP/LWAPP towards the access controller 116 (e.g., a WLAN Access Controller). The data plane is provided by the WAG 102 via the Layer 2 domain 106 to the radio nodes 104. In some embodiments, the device user plane traffic is tunneled using, e.g., SoftGRE and/or any other standards-based Layer 2 tunneling protocol, to the WAG 102.

Wi-Fi access gateway 102 can include a processor (not shown) configured to implement the functionality described herein using computer executable instructions stored in temporary and/or permanent non-transitory memory. The memory can be flash memory, a magnetic disk drive, an optical drive, a programmable read-only memory (PROM), a read-only memory (ROM), or any other memory or combination of memories. The processor can be a general purpose processor and/or can also be implemented using an application specific integrated circuit (ASIC), programmable logic array (PLA), field programmable gate array (FPGA), and/or any other integrated circuit. The Wi-Fi access gateway 102 can include a database that may also be flash memory, a magnetic disk drive, an optical drive, a programmable read-only memory (PROM), a read-only memory (ROM), or any other memory or combination of memories. The Wi-Fi access gateway 102 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

Referring further to the WAG 102, the WAG 102 can provide a data plane with radio nodes 104. In some embodiments, the WAG 102 is a highly scalable platform that implements data/traffic plane aggregation of switched Ethernet virtual domains over a wide geographical area, allowing the WAG 102 to serve millions of devices. The WAG 102 can include connections to each of the radio nodes 104, such as a generic routing encapsulation (GRE) tunnel that encapsulates the Layer 2 traffic from the Wi-Fi devices 108, served by a corresponding radio node 104.

In some embodiments, the WAG 102 provides high performance point-to-point switched Layer 2 domain. In a classical OSI layered computer networking model, network mobility (e.g., for session persistence) is often quicker at lowers layers, e.g. Ethernet (layer 2) as opposed to networking layer (L3) or application layer (L7). However, the lower layers are often more messaging intensive than higher layers. The techniques described herein provide for a wide area Layer 2 network, such that high-performance equipment is able to participate with exponentially large number of transactions per second (TPS) while still providing seamless mobility at the MAC layer (Ethernet Layer). For example, flat Layer 2 domains (e.g., also called broadcast domains) are usually geographically small by design. To create a wide area Layer 2 network, virtual networks can be created by creating Layer 2 tunnels such that two devices think that they can see each other directly, yet they are located remotely from each other. These tunnels (e.g., also called overlays) are point to point over a routed IP network. Under some embodiments, such tunnels are also called pseudo-wires.

In some embodiments, the WAG 102 provides a high performance IP data/forwarding plane that can analyze, shape, forward, etc. IP traffic from end Wi-Fi devices. As alluded to above, Layer 2 domains are often very messaging intensive, which is why they are often limited to a small geographical area serving a small set of devices on a Ethernet segment. However, by creating large wide area Layer 2 networks, the techniques described herein can support processing a tremendous number (e.g., hundreds of millions) of packets/frames per second by using wide area Layer 2 networks. Dense aggregation at the WAG 102 with a high performance forwarding plane (e.g., packet processing) allows service providers to, for example, inspect, and inject cloud-based bespoke data services (e.g. content filtering and parental control).

Referring to the Layer 2 domain 106, the WAG 102 and the radio nodes 104 are connected via the Layer 2 domain 106. For example, the Layer 2 domain 106 can be provided using Layer 2 switching that uses the media access control (MAC address) from a device to determine where to forward frames. The Layer 2 domain 106 can implement the switching via hardware, such as using application-specific integrated circuits to build and maintain the filter tables. Additionally, for example, unlike other layers the Layer 2 domain 106 does not need to modify the data packet. Thus the Layer 2 domain 106 can be advantageous because it can provide high speed transmissions with low latency. As described above, the Layer 2 domain 106 provides Layer 2 point-to-point tunnels between the radio nodes 104 and the WAG 102. For example, an IP point-to-point tunnel can be established so that Layer 2 packets can be wrapped in IP packets and transmitted freely between the radio nodes 104 and the WAG 102.

The WAG 102 can provide IP services and/or muting functions, such as DHCP, UPnP, NAT-PMP, ACL, the address resolution protocol (ARP), and/or other services and functions. The WAG 102 can provide dual stack IP to offer service to both IPv4 and IPv6. As shown in FIG. 1, the WAG 102 can provide backbone connectivity to multiple IP cloud services 112 and/or the internet 110. The WAG 102 can also provide security and session isolation among connections with each of the radio nodes 104.

Referring to the radio node 104, as described above with respect to the WAG 102, the radio node 104 can include a processor configured to implement the functionality described herein using computer executable instructions stored in temporary and/or permanent non-transitory memory. As explained further herein, due to the system 100 structure the radio node 104 can be less complex than existing nodes, and can therefore be a lower-cost device. For example, access points typically have complete IP routing capability (e.g., in addition of providing Radio function, the access points also provide an edge router function and offer services like DHCP Service, IP NAT service, etc.). These and other features often make access points complex and rigid. The radio node 104, on the other hand, in some embodiments is comparable to the access point only from a radio-function standpoint. For example, in some embodiments the radio node 104 does not have the IP router function and associated IP services. Rather, such radio nodes 104 merely bridge the Internet traffic to the core IP services Node using point-to-point Layer 2 overlay (e.g., tunnels). This makes the Radio Nodes simpler and IP services agnostic.

The radio node 104 can be configured to implement a Layer 2 bridge that terminates Wi-Fi MAC (e.g., 802.11x RF) towards a device. And as described herein the radio node 104 can encapsulate the Layer 2 traffic from a device for transmission to the WAG 102 (e.g., via GRE tunnel encapsulation of Layer 2 traffic from a device). The radio node 104 can implement an open programmable Layer 2 forwarding information base (FIB) that can be controlled by, e.g., a flow controller in the management entity 118 or a flow controller in a service provider's private cloud. The FIB is the Layer 2 forwarding table. The radio nodes 104 have the FIB so that it can keep any local Layer 2 traffic local, while the radio nodes 104 tunnel the rest of the traffic via Layer 2 up to the WAG 102. FIBs in the radio nodes 104 can be dynamically controlled or programmed from the network using a control protocol. This can allow the core network to control the Layer 2 forwarding behavior of the radio node 104 in a programmatic fashion.

A service set includes all the devices associated with a consumer or enterprise IEEE 802.11 wireless local area network. A basic service set (BSS) is often used to refer to a single access point together with all associated stations. An extended service set (ESS) is a set of two or more interconnected wireless BSSs that share similar features (e.g., network name, security credentials, etc.). Each BSS or ESS is identified by a service set identifier (SSID), which is usually a human-readable string often referred to as the "network name." The radio node 104 can support multiple virtual SSIDs, where each SSID is treated like a vertically isolated virtual Layer 2 domain. Wi-Fi networks that use spectrum in the ISM bands are generally identified by a "SSID". SSID is an identifier for the Wi-Fi Network that is displayed to the user who wants to connect to a Wi-Fi network. Newer Wi-Fi standards allow the Access Points to broadcast many SSIDs that actually share the same Radio/channel. While the users think that they are connecting to separate SSIDs, these (virtual) SSIDs are actually using the same spectrum/RF resources. This allows the Wi-Fi service provider to broadcast many SSIDs where each SSID represents a certain service. However, these SSIDs share the same available physical resources. Therefore virtual SSIDs can be used to provide service isolation.

The techniques described herein allow the service provider to virtually slice every VLAN/SSID as an independent and isolated Layer 2 domain. The techniques described herein can support scalable Virtual IP Router (VIPR) functions that can be applied to any isolated Layer 2 domain. This can enable a new class of virtualization that extends from the device to the service provider's services (e.g., cloud services).

Referring to the Layer 2 domain 106, the Layer 2 domain 106 provides Layer 2 data connections between the Wi-Fi devices 108 (via the radio nodes 104) and the WAG 102. In the seven-layer OSI model of computer networking, Layer 2 is often referred to as the data link layer. In the TCP/IP reference model, Layer 2 is often referred to as being part of the link layer. The Layer 2 domain 106 implements a Layer 2 protocol to transfer data between the radio nodes 104 and the WAG 102.

Referring to Wi-Fi device 108, a Wi-Fi device 108 can include any type of device that supports WiFi, such as laptops, desktops, smartphones, tablets, gaming consoles, embedded household appliances (e.g., TVs, thermostats), and/or other devices that support Wi-Fi.

Referring to cloud services 112, the services can include, for example, cloud IP services. For example, cloud services 112 can include services that provide for sharing of digital media between multimedia devices. For example, the Digital Living Network Alliance (DLNA) provides guidelines for digital media sharing that specify a set of restricted ways of using the standards to achieve interoperability. The cloud services 112 can include video on demand services, as explained further herein with reference to FIG. 3. The cloud services 112 can include parental management controls, as explained further herein with reference to FIG. 5.

Traditional connected home technologies (e.g., such as Universal Plug and Play (UPnP) and Digital Living Networks Alliance (DLNA)) are often limited to spatial locality due to existing LAN-based technology. The techniques described herein remove this LAN limitation, enabling wide area implementation of DLNA and UPnP. Virtual wide area multicast/broadcast domains provided using the techniques described herein can let media servers and content servers in the cloud present themselves in the home WLAN. At present, it is estimated that there are thousands of UPnP/DLNA certified devices, and billions of devices installed worldwide. By extending UPnP/DLNA from a LAN to a Wide Area LAN using the techniques described herein, service providers can leverage a cloud SDN architecture to provide services, connectivity, mobility, and/or the like.

Referring to the management entity 118, as described above with respect to the WAG 102, the management entity 118 can include a processor configured to implement the functionality described herein using computer executable instructions stored in temporary and/or permanent non-transitory memory. In some embodiments the management entity 118 is a cloud-based platform leveraging open compute APIs to the radio nodes 104 and the WAG 102. For example, the management entity 118 can implement the SDN control plane, management plane, device management, and/or the like. For example, Technical Report 069 (TR-069) is a Broadband Forum technical specification entitled Customer-Premises Equipment Wide Area Network Management Protocol (CWMP) that defines an application payer protocol for remote management of end-user devices. The management entity 118 can use a TR-069-based plug and play management interface to implement the management plane. In some embodiments, the management entity 118 provides network-wide global service and policy control of service provider Wi-Fi services and device connectivity. In some embodiments, the WAG 102 includes a SDN controller (not shown) to manage Layer 2 forwarding information bases (FIBs) in the Wi-Fi radio nodes 104. In some embodiments, the management entity 118 provides a SDN controller to manage Layer 2 FIBs in the Wi-Fi Radio Nodes for policy-based local switching. In some embodiments, the management entity 118 provides scalable resource management of the radio nodes 104. The management entity 118 can also provide flexible integration of operations and business systems (e.g., to monetize Wi-Fi).

Referring to the access controller 116, as described above with respect to the WAG 102, the access controller 116 can include a processor configured to implement the functionality described herein using computer executable instructions stored in temporary and/or permanent non-transitory memory. In some embodiments the access controller 116 provides a highly scalable IP control plane to the radio nodes 104 that can be scaled linearly on demand. In traditional hardware based "box" centric architectures, the scale is typically constant whether one needs less performance or more. However, using the techniques described herein, the control plane is software-based and can therefore be scaled "on demand" linearly (e.g., as opposed to "box" based steps with hardware based silo boxes) by adding more and more generic compute/blade servers on demand. The access controller 116 can use a custom or publicly-defined protocol to manage the radio nodes. The access controller 116 can be a WLAN Access Controller (AC). The access controller 116 can terminate the WLAN control plane to apply opportunistic WLAN RRM (Self Organizing Network) SON capabilities, e.g., in dense WLAN deployments. By separating the user device traffic plane (e.g., terminated at the WAG 102) and the control plane (e.g., terminated at the access controller 116), the techniques described herein can allow the access controller 116 to scale for compute intensive tasks of RRM, as necessary. For example, since the two planes are separated, the access controller 116 may not be limited by user device traffic plane throughput.

As an illustrative example, the distribution of functions between radio nodes 104, the access controller 116, and the WAG 102 can be distributed as described below. The radio nodes 104 can be configured to provide: beacon generation; probe response/transmission; real-time control frames (e.g., RTS/CTS/ACK/PS-Poll/CF-End/CF-Ack); synchronization; retransmission; and 802.11 encryption/decryption (e.g., of MAC service data units, or MSDUs). The radio nodes 104 and the WAG 102 can be configured to provide transmission rate adaption (e.g., the WAG 102 can provide DSCP marking); MSDU Integration Service (e.g., bridging 802.11 to 802.3) such as GRE; and device user plane QoS (e.g., the radio nodes 104 can provide QoS over the air, while the WAG 102 can provide QoS such as traffic shaping and DSCP marking) The access controller 116 can provide device association/disassociation/re-association; transmit power/channel bandwidth/channel assignment/antenna parameters/load balancing (SON); and radio node 104 automatic configuration and management. The WAG 102 can provide MSDU Distribution Service (e.g., intra-system user traffic/mobility); subscriber services (e.g., DHCP) and Internet gateway services; and device policy, billing and charging.

The components of system 100 can include additional interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, such as optical, copper, and wireless, and in a number of different protocols, some of which may be non-transient.

While the techniques described herein describe in some embodiments using the techniques over a set of radio nodes in communication with a WAG, one of skill in the art can appreciate that the resulting network created can include a single network or combination of networks. For example, the network can include a local area network (LAN), a cellular network, a telephone network, a computer network, a private packet switching network, a line switching network, a wide area network (WAN), and/or any number of networks. Such networks may be implemented with any number of hardware and software components, transmission media and network protocols. FIG. 1 shows the WAG 102 creating a single Layer 2 domain 106 among the wired devices 110 and the wireless devices 112; however, the network can include multiple interconnected networks listed above.

Figure 2:
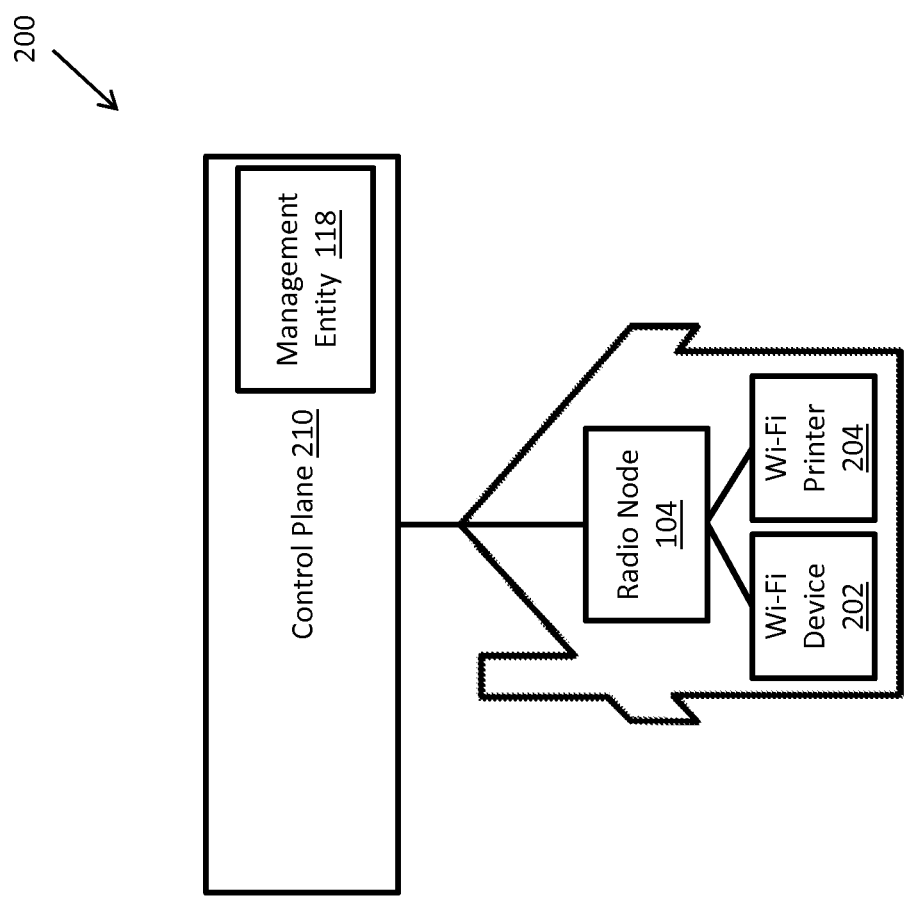
FIG. 2 illustrates an example of a Wi-Fi device printing to a local Wi-Fi printer using centrally managed Wi-Fi, according to some embodiments.

FIG. 2 illustrates an example 200 of a Wi-Fi device 202 printing to a local Wi-Fi printer 204 using centrally managed Wi-Fi, according to some embodiments. The radio node 104 can switch the session between the Wi-Fi device 202 and the Wi-Fi printer 204 locally via a FIB in the radio node 104. For example, the management entity 118 can provide initial or default parameters for the FIB. The WAG 102 can include a controller function that recognizes the two Wi-Fi devices 202 and 204 are both local to the radio node 104, and therefore controls the radio node 104 via the control plane 210 so that the radio node 104 switches communications between the two devices locally rather than switching through the WAG 102. In some embodiments, the protocol the management entity 118 uses to control the FIB in the radio node 104 is OpenFlow. With OpenFlow the WAG 102 controls the radio node 104 FIB table entries.

Figure 3:
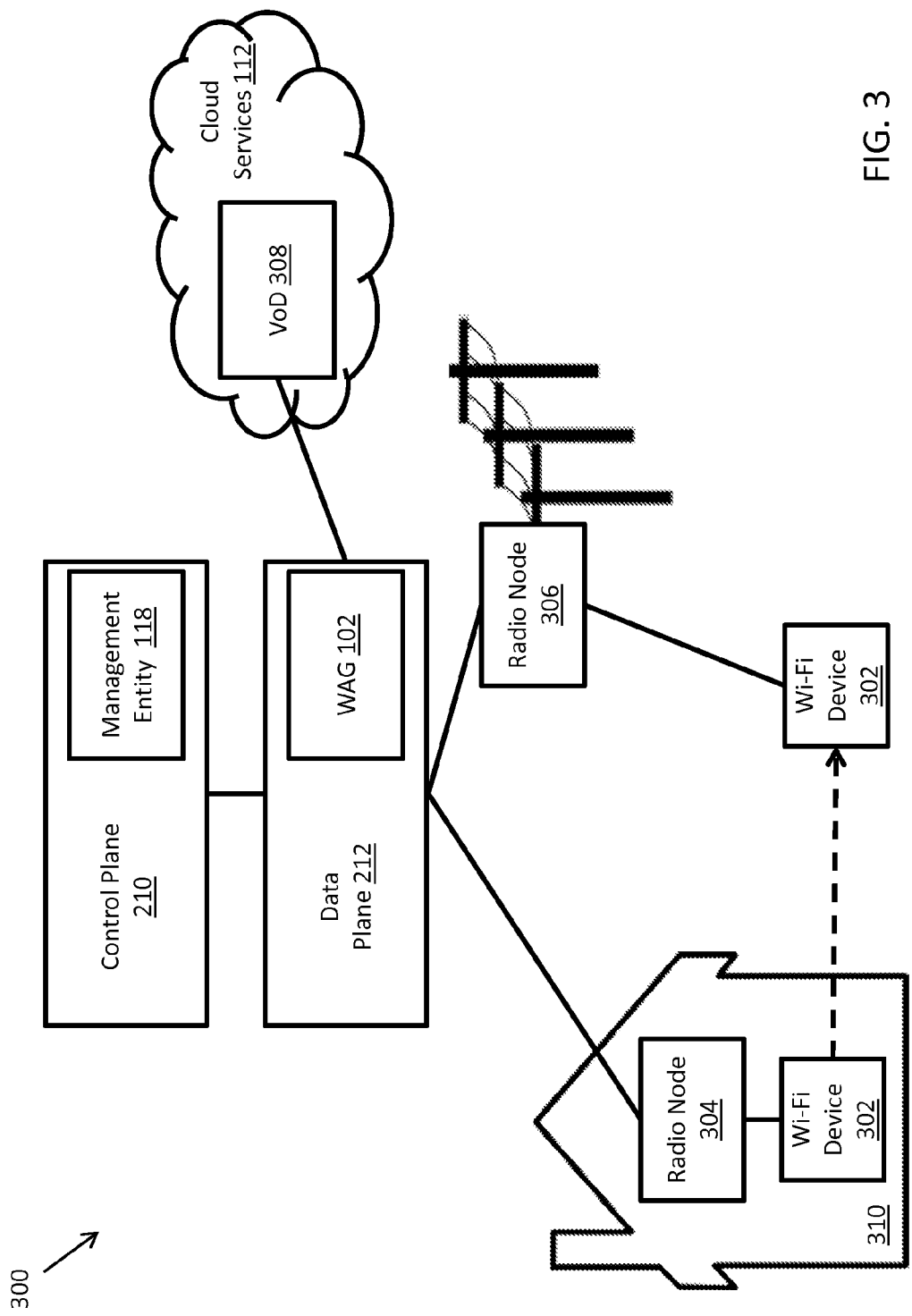
FIG. 3 illustrates an example of a Wi-Fi device moving to a different radio node using centrally managed Wi-Fi, according to some embodiments.

In some embodiments, the WAG 102 provides Ethernet mobility so that a Wi-Fi device can move among various radio nodes 104 and maintain a Wi-Fi connection. For example, the WAG 102 can us MAC learning and MAC attachment of devices to the Wi-Fi radio nodes 104 to maintain Wi-Fi for mobile devices. For example, as described above the radio nodes are Wi-Fi radio nodes, so a Wi-Fi device attaches to a radio node using its MAC address. Since the WAG has a virtual Layer 2 connection with the radio node (e.g., via Layer 2 data encapsulated in Ethernet frames), the WAG starts seeing data frames coming from the Wi-Fi device from the radio node with the Wi-Fi device's MAC address. In some embodiments, for the first frame the WAG sees with the Wi-Fi device MAC address, the WAG associates the Wi-Fi device with the radio node. As users are walking around the device attaches to a radio node, for example, the WAG can update the device's attachment to a new radio node when it sees data frames from the device coming from different radio nodes. FIG. 3 illustrates an example 300 of a Wi-Fi device 302 moving from radio node 304 to a different radio node 306 using centrally managed Wi-Fi, according to some embodiments. The Wi-Fi device 302 is streaming a session from a service provider's video on demand (VoD) service through the data plane 212 to the radio node 304 in the home 310.

When the Wi-Fi device 302 moves to outdoor Wi-Fi coverage using the radio node 306, the management entity 118 maintains the Wi-Fi device 302's session with the VoD 308 through the data plane 212. The management entity 118 can provide DLNA interworking from the VoD 308 to the Wi-Fi device 302 via the control plane 210, extending DLNA to the data plane 212. Other approaches, such as layer three approaches, often have a much more complex control plane and thus slower handover latency. DLNA can use IP Multicast (UPnP) for content discovery. Since IP Multicast is a local area network technology, DLNA service is limited to a Layer 2 broadcast domain only (e.g. limited to a house or a branch office). By creating wide area Layer 2 virtual network using point-to-point L2 tunnels/overlays based on softGRE, IP Broadcast/Multicast services can work transparently over a wide area. As an example, a user could be traveling and still connect to their DLNA-enabled Blue-Ray DVD player and watch content from a hotel (e.g., just as if the user is at home).

Figure 4:
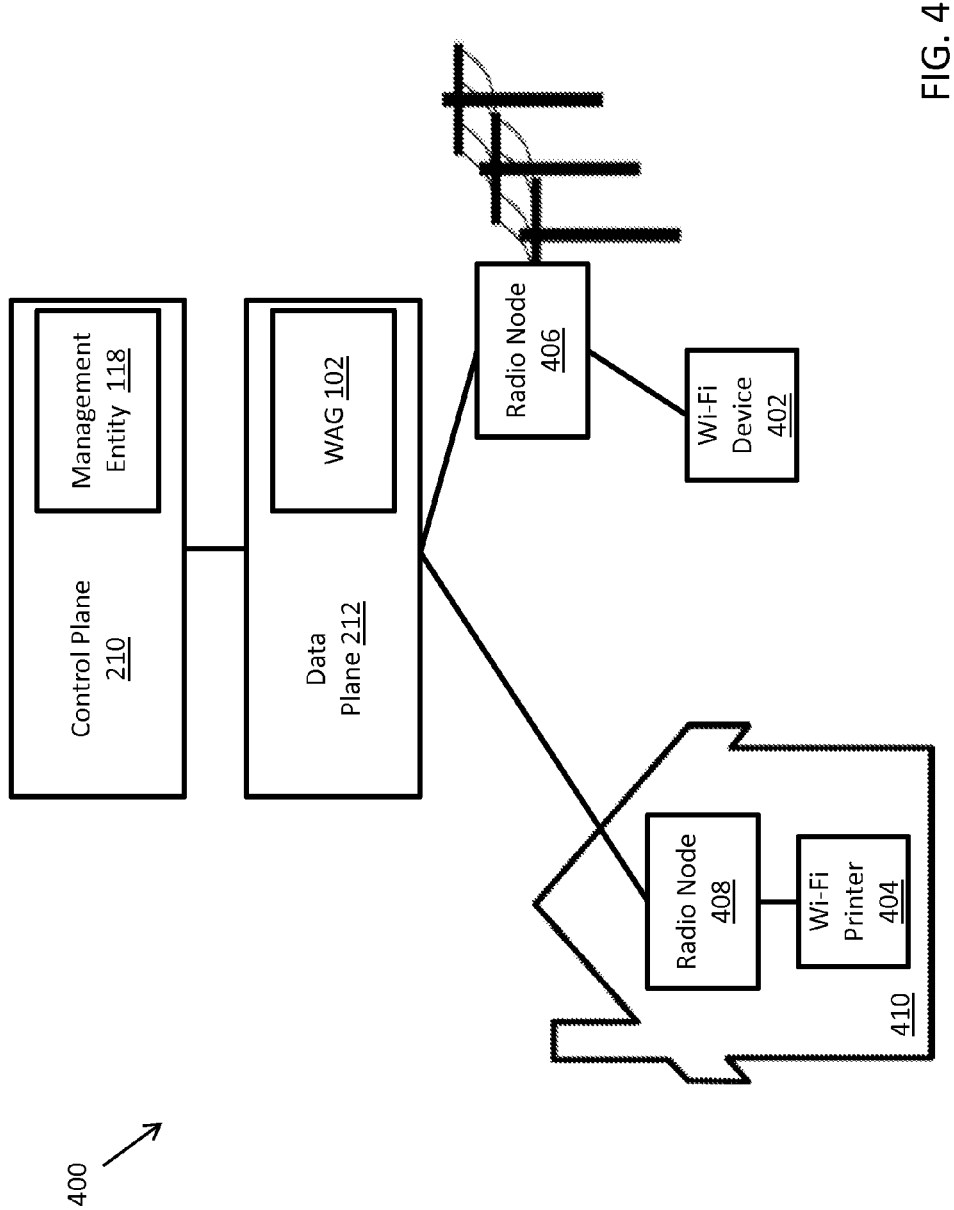
FIG. 4 illustrates an example of a Wi-Fi device printing to a Wi-Fi printer supported by a different radio node using centrally managed Wi-Fi, according to some embodiments.

FIG. 4 illustrates an example of a Wi-Fi device 402 in communication with radio node 406 printing to a Wi-Fi printer 404 supported by a different radio node 408 using centrally managed Wi-Fi, according to some embodiments. The Wi-Fi device 402 is connected to the radio node 406 providing outdoor Wi-Fi. The user of the Wi-Fi device 402 wants to print remotely to the home network provided by the radio node 408 for the user's home 410. The WAG 102 provides simplified access via the data plane 212, and the management entity 118 provides a global policy control to establish connectivity and mobility between the Wi-Fi device 402 and the Wi-Fi printer 404. Native Multicast/Broadcast protocols like mDNS, Bonjour, NetBios, SMB2, etc. for home networking work transparently. In this example shown in FIG. 4, Bonjour can be used by printers for printer discovery and printing.

Figure 5:
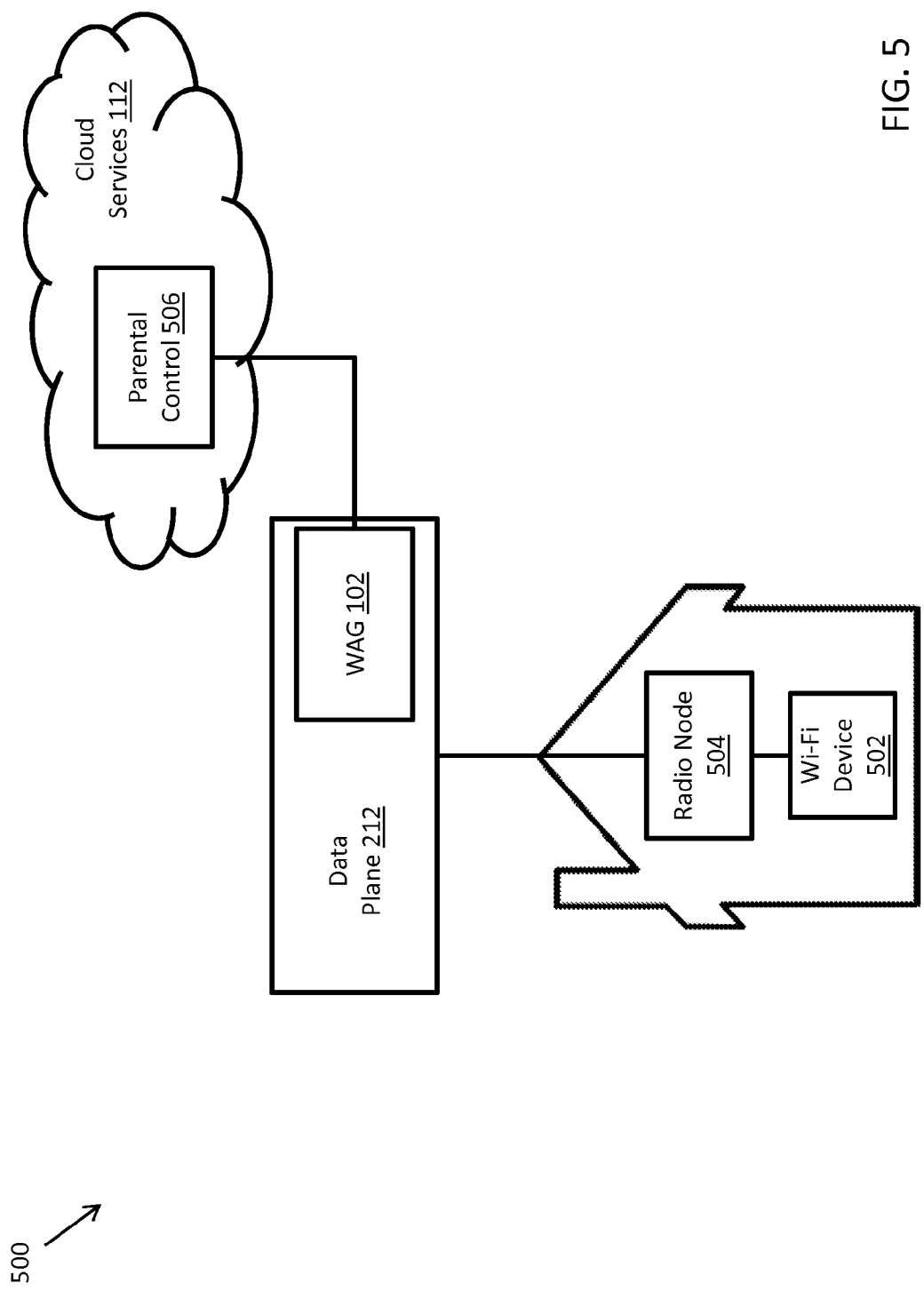
FIG. 5 illustrates an example of parental control of a Wi-Fi device using centrally managed Wi-Fi, according to some embodiments.

FIG. 5 illustrates an example 500 of parental control of a Wi-Fi device 502 using centrally managed Wi-Fi, according to some embodiments. A user (e.g., a child) is using Wi-Fi device 502, which has been configured using a parental control service so that the device can only access a special SSID where content filtering is performed using cloud-based parental control server 506. The parental control server 506 is coupled to the radio node 504 via the data plane 212, and the radio node 504 steers all flows from the Wi-Fi device 502 to the parental control server 506. The centrally managed Wi-Fi allows the parental control service provider to enable a large number of user devices to use the parental control service provided by the parental control server 506, cost-effectively and quickly. By creating virtual Layer 2 networks, customer devices connect to the core network at Layer 2. Hence such devices can be transparently switched/bridged to application servers like parental control or content filtering servers using softGRE Layer 2 service tunnels. Alternative approaches instead often rely on installing special clients or applications for each device, and/or rely on intelligence in the Home Gateway. These alternatives add cost and complexity compared to the techniques described herein.

Current end-to-end IP based wireless architectures rely on Mobile IP or Proxy Mobile IP to manage Wi-Fi device mobility. For a low speed walk test (e.g. a walking speed in a metropolitan area), Mobile IP is relatively efficient for macro cellular mobile broadband networks where ranges between cells are in the order of a few miles. At walking speeds, for example, an average mobility event occurs once per 30 minutes. Considering a mobile IP (L3) handover delay of the order of a second, such an average mobility event is acceptable.

However, in small cell/Wi-Fi systems, the cell sizes are in the order of 50 yards or less compared to miles as with macro cellular networks. Even at walking speeds, devices can trigger inter-AP mobility events every 10 seconds or less. Therefore, trying to adapt Mobile IP or Proxy Mobile IP to small cell/Wi-Fi systems becomes exponentially inefficient with increased frequency of handovers, leading to a suboptimal user experience.

This occurs because Mobile IP uses encapsulations and a number of different message exchanges, such as binding update exchanges, etc. Such encapsulations can also increase processing and signaling loads. The techniques described herein, on the other hand, does not rely on any IP messaging, while providing fast handovers (e.g., in less than a hundred ms). Since the devices connect to the WAG using virtual Layer 2 tunnels (e.g., Layer 2 data routed via IP connections), when the device moves from one radio node to another, the WAG learns about this mobility by looking at the source MAC address of the Ethernet frames and matching them to the Layer 2 tunnel of the radio node. The WAG then updates the location of the device as being bound to the new radio node and directs all the traffic towards the new radio node where the device has moved to.

For example, rather than perform IP address allocation, the techniques described herein use MAC learning and MAC attachment to maintain Wi-Fi connections. Additionally, mobility encapsulation is not needed because the WAG keeps a binding of device and radio nodes the device is known to be (or have been) attached to. As the device moves from one radio node to another, the WAG updates the bindings accordingly based on MAC learning. The techniques use a signaling procedure called MAC learning (e.g., matching the device MAC to the MAC of the radio node). Such a procedure does not require additional messaging.

The techniques described herein provide a scalable architecture for service provider applications. Since the Wi-Fi is centrally managed by one or more Wi-Fi access gateways, service providers can roll out new value-added services to all of its Wi-Fi clients. Network-based control of the architecture enables a common security framework for all managed Wi-Fi devices. For example, a Wi-Fi access gateway can update new threat vectors and/or reconfigure firewalls of the radio nodes rather than needing to independently manage or reconfigure each radio node.

Moving the complexity of the Wi-Fi access layer to the network (e.g., rather than at the individual radio nodes) can create high availability. For example, since service providers often have redundant data centers, the Layer 2 access layer is simple enough that it seldom fails, and the Wi-Fi access gateway can support full geographic redundancy. The simplification the Wi-Fi radio nodes as described herein facilitates remote configuration management and upgrades. The architecture can enable over subscription and efficient use of pooled resources in an elastic way for control plane and data plane shared across all the Wi-Fi radio nodes. Additionally, network-based service control enables a third party developer ecosystem leveraging a rich API suite. For example, service providers can create a healthy ecosystem of application developers for niche value-added services.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D, . . . .

What is claimed is:

1. A computerized method for providing centrally managed Wi-Fi using internet protocol (IP) connections between a central Wi-Fi access gateway and one or more radio nodes, wherein the radio nodes and the Wi-Fi access gateway are connected across a wide area network, and the Wi-Fi access gateway controls Wi-Fi services for Wi-Fi devices connected to the radio nodes, comprising:

establishing, by a Wi-Fi access gateway, an IP connection with a first radio node across a wide area network, wherein the first radio node is configured to wirelessly connect to one or more Wi-Fi devices located near the first radio node;

receiving, by the Wi-Fi access gateway, Layer 2 traffic over the IP connection, wherein the Layer 2 traffic is associated with a Wi-Fi device from the one or more Wi-Fi devices connected to the first radio node;

controlling, by the Wi-Fi access gateway, one or more Wi-Fi services for the Wi-Fi device based on the Layer 2 traffic so that the Wi-Fi access gateway can provide centrally managed Wi-Fi for the Wi-Fi device;

determining, by the Wi-Fi access gateway, that a destination of the Layer 2 traffic is a second Wi-Fi device from the one or more Wi-Fi devices connected to the first radio node; and transmitting, from the Wi-Fi access gateway to the first radio node, a message that manages a forwarding information base table stored at the first radio node so that the first radio node connects the one or more Wi-Fi devices to the second Wi-Fi device by locally routing traffic between the one or more Wi-Fi devices and the second Wi-Fi device without routing to the Wi-Fi access gateway.

2. The computerized method of claim 1, further comprising:

determining that a destination of the Layer 2 traffic is a second Wi-Fi device connected to a second radio node, wherein the Wi-Fi access gateway is connected to the second radio node by a second IP connection across the wide area network; and transmitting the Layer 2 traffic to the second radio node over the second IP connection.

3. The computerized method of claim 1, further comprising:

determining, based on the Layer 2 traffic, that the Wi-Fi device associated with the Layer 2 data traffic had a Wi-Fi data connection with a second radio node, and that the Wi-Fi device moved so that the Wi-Fi device has a Wi-Fi connection with the first radio node instead of with the second radio node; and maintaining the Wi-Fi data connection with the Wi-Fi device even though it moved from being connected to the second radio node to the first radio node.

4. The computerized method of claim 1, further comprising providing a data connection between the first radio node and the Wi-Fi access gateway using the IP connection, such that the control plane to the first radio node is provided using a different connection to the first radio node.

5. The computerized method of claim 1, further comprising:

identifying a MAC address associated with the Wi-Fi device in a first Layer 2 data frame received from the Wi-Fi device through the IP connection;

associating the Wi-Fi device with the first radio node;

receiving Layer 2 data from a second radio node over a second IP connection with the second radio node;

identifying the MAC address associated with the Wi-Fi device in the Layer 2 data from the second radio node; and associating the Wi-Fi device with the second radio node instead of the first radio node to initiate a handover of the Wi-Fi device from the first radio node to the second radio node.

6. A computing system configured to provide centrally managed Wi-Fi using internet protocol (IP) connections with one or more radio nodes, wherein the radio nodes are connected to the computing system across a wide area network, and the computing system controls Wi-Fi services for Wi-Fi devices connected to the radio nodes, comprising a processor configured to run a module stored in memory that is configured to cause the processor to:

establish an IP connection with a first radio node across a wide area network, wherein the first radio node is configured to wirelessly connect to one or more Wi-Fi devices located near the first radio node;

receive Layer 2 traffic over the IP connection, wherein the Layer 2 traffic is associated with a Wi-Fi device from the one or more Wi-Fi devices connected to the first radio node;

control one or more Wi-Fi services for the Wi-Fi device based on the Layer 2 traffic so that a Wi-Fi access gateway can provide centrally managed Wi-Fi for the Wi-Fi device;

determine that a destination of the Layer 2 traffic is a second Wi-Fi device from the one or more Wi-Fi devices connected to the first radio node; and transmit, to the first radio node, a message that manages a forwarding information base table stored at the first radio node so that the first radio node connects the one or more Wi-Fi devices to the second Wi-Fi device by locally routing traffic between the one or more Wi-Fi devices and the second Wi-Fi device without routing to the Wi-Fi access gateway.

7. The computing system of claim 6, wherein the module is configured to cause the processor to:

determine that a destination of the Layer 2 traffic is a second Wi-Fi device connected to a second radio node, wherein the Wi-Fi access gateway is connected to the second radio node by a second IP connection across the wide area network; and transmit the Layer 2 traffic to the second radio node over the second IP connection.

8. The computing system of claim 6, wherein the module is configured to cause the processor to:

determine, based on the Layer 2 traffic, that the Wi-Fi device associated with the Layer 2 data traffic had a Wi-Fi data connection with a second radio node, and that the Wi-Fi device moved so that the Wi-Fi device has a Wi-Fi connection with the first radio node instead of with the second radio node; and maintain the Wi-Fi data connection with the Wi-Fi device even though it moved from being connected to the second radio node to the first radio node.

9. The computing system of claim 6, wherein the module is configured to cause the processor to:

identify a MAC address associated with the Wi-Fi device in a first Layer 2 data frame received from the Wi-Fi device through the IP connection;

associate the Wi-Fi device with the first radio node;

receive Layer 2 data from a second radio node over a second IP connection with the second radio node;

identify the MAC address associated with the Wi-Fi device in the Layer 2 data from the second radio node; and associate the Wi-Fi device with the second radio node instead of the first radio node to initiate a handover of the Wi-Fi device from the first radio node to the second radio node.

10. A non-transitory computer readable medium having executable instructions operable to cause an apparatus to:

establish an IP connection with a first radio node across a wide area network, wherein the first radio node is configured to wirelessly connect to one or more Wi-Fi devices located near the first radio node;

receive Layer 2 traffic over the IP connection, wherein the Layer 2 traffic is associated with a Wi-Fi device from the one or more Wi-Fi devices connected to the first radio node;

control one or more Wi-Fi services for the Wi-Fi device based on the Layer 2 traffic so that the Wi-Fi access gateway can provide centrally managed Wi-Fi for the Wi-Fi device;

determine, by the Wi-Fi access gateway, that a destination of the Layer 2 traffic is a second Wi-Fi device from the one or more Wi-Fi devices connected to the first radio node; and transmit, from the Wi-Fi access gateway to the first radio node, a message that manages a forwarding information base table stored at the first radio node so that the first radio node connects the one or more Wi-Fi devices to the second Wi-Fi device by locally routing traffic between the one or more Wi-Fi devices and the second Wi-Fi device without routing to the Wi-Fi access gateway.

11. The non-transitory computer readable medium of claim 10, having executable instructions operable to cause an apparatus to:

determine that a destination of the Layer 2 traffic is a second Wi-Fi device connected to a second radio node, wherein the Wi-Fi access gateway is connected to the second radio node by a second IP connection across the wide area network; and transmit the Layer 2 traffic to the second radio node over the second IP connection.

12. The non-transitory computer readable medium of claim 10, having executable instructions operable to cause an apparatus to:

determine, based on the Layer 2 traffic, that the Wi-Fi device associated with the Layer 2 data traffic had a Wi-Fi data connection with a second radio node, and that the Wi-Fi device moved so that the Wi-Fi device has a Wi-Fi connection with the first radio node instead of with the second radio node; and maintain the Wi-Fi data connection with the Wi-Fi device even though it moved from being connected to the second radio node to the first radio node.

13. The non-transitory computer readable medium of claim 10, having executable instructions operable to cause an apparatus to:

identify a MAC address associated with the Wi-Fi device in a first Layer 2 data frame received from the Wi-Fi device through the IP connection;

associate the Wi-Fi device with the first radio node;

receive Layer 2 data from a second radio node over a second IP connection with the second radio node;

identify the MAC address associated with the Wi-Fi device in the Layer 2 data from the second radio node; and associate the Wi-Fi device with the second radio node instead of the first radio node to initiate a handover of the Wi-Fi device from the first radio node to the second radio node.

* * * * *